(12) United States Patent
Sasaki et al.

(10) Patent No.: US 11,128,175 B2
(45) Date of Patent: Sep. 21, 2021

(54) WIRELESS POWER TRANSMISSION APPARATUS

(71) Applicant: SHARP KABUSHIKI KAISHA, Sakai (JP)

(72) Inventors: Masato Sasaki, Sakai (JP); Tomohisa Yoshie, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/646,032

(22) PCT Filed: Aug. 22, 2018

(86) PCT No.: PCT/JP2018/030995
§ 371 (c)(1),
(2) Date: Mar. 10, 2020

(87) PCT Pub. No.: WO2019/054142
PCT Pub. Date: Mar. 21, 2019

(65) Prior Publication Data
US 2020/0212715 A1    Jul. 2, 2020

(30) Foreign Application Priority Data
Sep. 14, 2017   (JP) ............................ JP2017-176651

(51) Int. Cl.
*H02J 50/12*    (2016.01)
(52) U.S. Cl.
CPC .................................. *H02J 50/12* (2016.02)
(58) Field of Classification Search
CPC .................. H02J 50/10; H02J 50/12

USPC ......................................................... 307/104
See application file for complete search history.

(56) References Cited

U.S. PATENT DOCUMENTS

| | | | | |
|---|---|---|---|---|
| 2011/0285210 A1* | 11/2011 | Lemmens | ............... | H01F 38/14 307/104 |
| 2014/0152248 A1* | 6/2014 | Yeh | ......................... | H02J 50/10 320/108 |
| 2015/0054456 A1* | 2/2015 | Yamakawa | ......... | H02J 7/00034 320/108 |
| 2015/0108849 A1* | 4/2015 | Robertson | .............. | G01R 19/15 307/104 |
| 2015/0194814 A1* | 7/2015 | Taylor | .................. | H04B 5/0037 307/31 |
| 2015/0207333 A1* | 7/2015 | Baarman | ................. | H02J 50/12 307/104 |
| 2016/0006267 A1* | 1/2016 | Muratov | ................. | B60L 53/60 307/104 |
| 2016/0380485 A1* | 12/2016 | Murayama | ............. | H02J 7/025 307/104 |

(Continued)

FOREIGN PATENT DOCUMENTS

JP   2014-110733 A   6/2014
JP   2017-022804 A   1/2017

*Primary Examiner* — Levi Gannon
(74) *Attorney, Agent, or Firm* — ScienBiziP, P.C.

(57) ABSTRACT

Provided is a wireless power transmission apparatus capable of efficiently supplying power. The wireless power transmission apparatus includes: a power transmission coil; an inverter driving the power transmission coil; a DC/DC conversion circuit driving the inverter; and a control circuit varying and determining an output voltage instruction value to the DC/DC conversion circuit, in order to decrease power output from the DC/DC conversion circuit.

11 Claims, 11 Drawing Sheets

(56) References Cited

U.S. PATENT DOCUMENTS

| | | | |
|---|---|---|---|
| 2018/0062430 A1* | 3/2018 | Matsumoto | B60L 53/122 |
| 2018/0212468 A1* | 7/2018 | Liu | H02J 50/12 |
| 2018/0219415 A1* | 8/2018 | Ren | H02J 7/007 |
| 2018/0241301 A1* | 8/2018 | Nagaoka | B60L 53/20 |
| 2019/0312468 A1* | 10/2019 | Kwon | H02J 50/12 |

* cited by examiner

WIRELESS POWER TRANSMISSION APPARATUS

TECHNICAL FIELD

The present disclosure relates to a technique to supply power to an electric appliance.

The present application claims priority to Japanese Patent Application No. 2017-176651, filed Sep. 14, 2017, the contents of which are incorporated herein by reference in its entirety.

BACKGROUND ART

There are known techniques to supply power to electric appliances. For example, Japanese Unexamined Patent Application Publication No. 2017-022804 (Patent Document 1) discloses a power transmission apparatus and a method for controlling the power transmission apparatus. In Patent Document 1, the power transmission apparatus includes: a DC/DC converter converting an input voltage to obtain an output voltage to be provided to a power transmission antenna used for wireless transmission of power to a power reception apparatus; and a controller determining a target output voltage for the DC/DC converter, based on power consumed by the power receiving apparatus, and sending a value of the determined target output voltage to the DC/DC converter. If the determined target output voltage is within a predetermined range including a voltage equal to the input voltage of the DC/DC converter, the controller corrects the target output voltage to be sent to the DC/DC converter, so that the value of the target output voltage is set out of the predetermined range.

Moreover, Japanese Unexamined Patent Application Publication No. 2014-110733 (Patent Document 2) discloses a wireless power transmission apparatus. In Patent Document 2, the wireless power transmission apparatus includes: a power supply coil; a power source circuit; a power reception coil; a capacitor; and a load circuit. The power source circuit includes: a power source; a voltage conversion circuit; and a current detection circuit detecting a value of a current running through an input or an output of the voltage conversion circuit. The voltage conversion circuit includes: a voltage converter converting an input voltage to be supplied from the power source; and a transformation controller to be connected to the voltage converter. The transformation controller controls a value of the voltage to be converted by the voltage converter, based on the current value detected by the current detection circuit.

CITATION LIST

Patent Literature

[Patent Document 1] Japanese Unexamined Patent Application Publication No. 2017-022804 (published on Jan. 26, 2017)

[Patent Document 2] Japanese Unexamined Patent Application Publication No. 2014-110733 (published on Jun. 12, 2014)

SUMMARY OF INVENTION

Technical Problem

The present disclosure intends to provide a wireless power transmission apparatus capable of efficiently supplying power.

Solution to Problem

According to an aspect of the present disclosure, a wireless power transmission apparatus provided includes: a power transmission coil; an inverter configured to drive the power transmission coil; a DC/DC conversion circuit configured to drive the inverter; and a controller configured to vary and determine an output voltage instruction value to the DC/DC conversion circuit, in order to decrease power output front the DC/DC conversion circuit.

Advantageous Effects Invention

As can be seen, the present disclosure can provide a wireless power transmission apparatus capable of efficiently supplying power.

DESCRIPTION OF EMBODIMENTS

Described below are embodiments of the present disclosure with reference to the drawings. It is to be noted that like reference numerals designate identical or corresponding components throughout the drawings. Such components share the same name and function. Hence, those components will not be repeatedly elaborated upon.

First Embodiment

Overall Configuration of Wireless Power Transmission Apparatus 100

Figure 1:
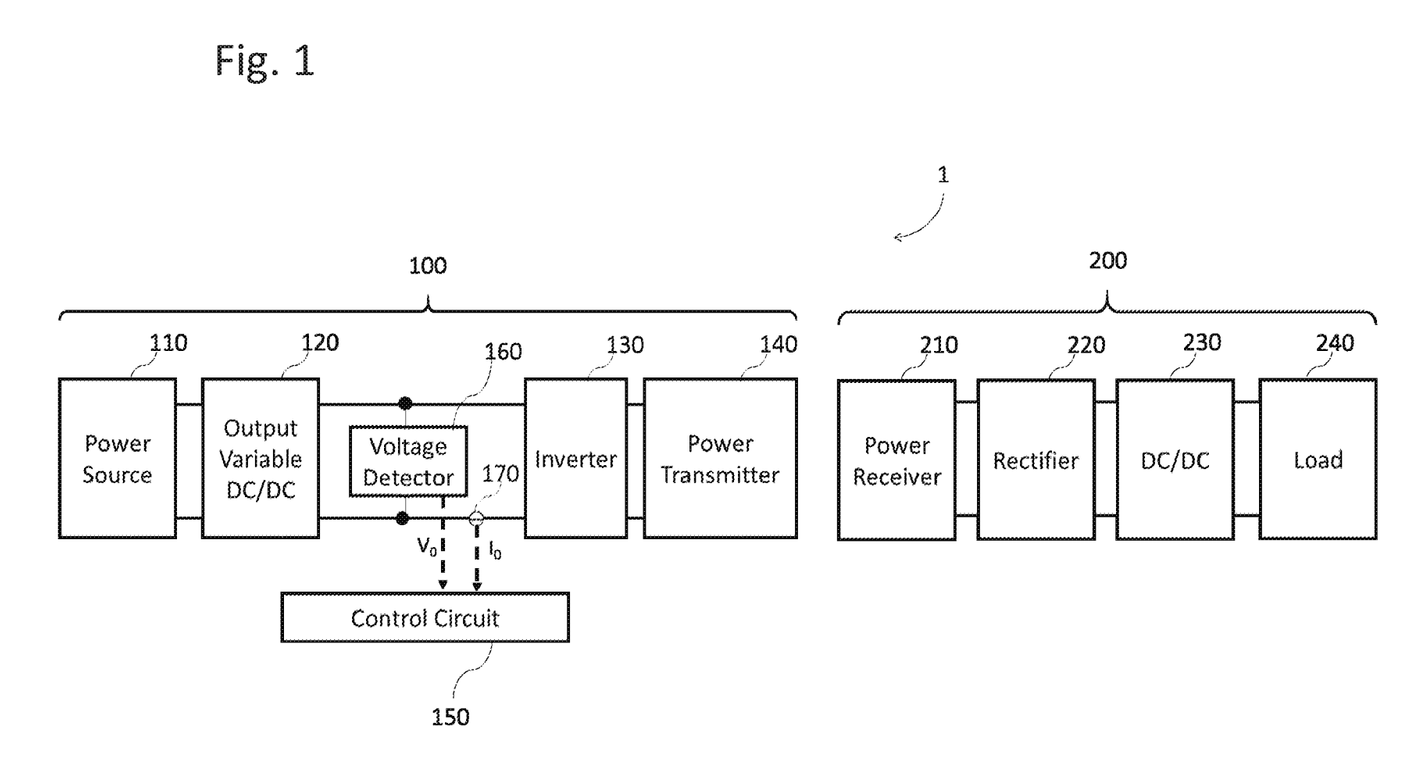
FIG. 1 schematically illustrates an overall configuration of a wireless power transmission apparatus according to a first embodiment.

Described below is an overall configuration of a wireless power transmission system 1 according to a first embodiment. With reference to FIG. 1, the wireless power transmission system 1 includes: a power transmission apparatus (a wireless power transmission apparatus) 100; and a power reception apparatus 200. The power transmission apparatus 100 includes: a power source 110; an output voltage variable DC/DC converter 120; an inverter 130; a power transmitter 140; a control circuit 150 (a controller); a voltage detector 160 connected in parallel with the output voltage variable DC/DC converter 120; and a current detector 170 connected in series between the output voltage variable DC/DC converter 120 and the inverter 130.

The inverter 130 generates an AC voltage having a predetermined transmission frequency (e.g., 13.56 MHz for the industrial scientific and medical (ISM) band), and outputs the generated AC voltage to the power transmitter 140. Based on a control signal from the control circuit 150, the output voltage variable DC/DC converter 120 regulates the voltage to be output by the inverter 130. The power transmitter 140 includes a resonance circuit for noncontact transmission of the power to the power receiver 210. The power transmitter 140 is driven on the AC voltage having the transmission frequency to generate an electromagnetic field. Through the generated electromagnetic field, the power transmitter 140 transmits the power to the power receiver 210 in a noncontact manner. The control circuit 150, including such components as a central processing unit (CPU) and a memory, controls the components of the power transmission apparatus 100.

The power reception apparatus 200 includes: the power receiver 210; a rectifier 220; a DC/DC converter 230; and a load 240. The power receiver 210 includes a resonance circuit for receiving the power in a noncontact manner. The DC/DC converter 230 converts the voltage of the power so that the output voltage to the load 240 has a predetermined value.

Figure 2:
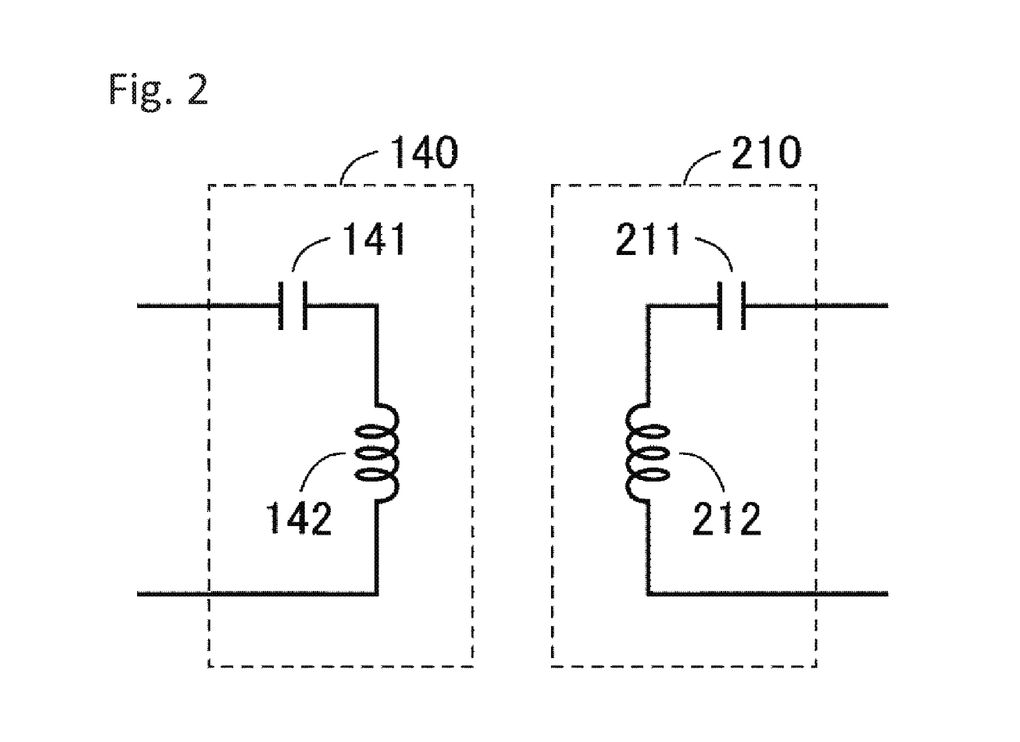
FIG. 2 schematically illustrates a power transmitter and a power receiver according to the first embodiment.

With reference to FIG. 2, the power transmitter 140 in this embodiment forms a series resonance circuit including a coil 142 and a capacitor 141 for power transmission. The power receiver 210 also includes a coil 212 and a capacitor 211 for receiving the power.

Here, in a magnetic resonance wireless power transmission system, the power transmission antenna and the power reception antenna are the same in resonance frequency in order to transmit power in a wireless manner from the power transmission antenna to the power reception antenna. One of the major features of the system is that the power transmission distance can be set from several tens of centimeters to several meters. Used as a variable parameter for the wireless power transmission system is of a positional relationship between a load power in the power reception and the antennae for power transmission and reception. In addition, a conversion efficiency of a DC/DC converter connected to the power reception is dependent on the load power, and thus is a variable parameter. Furthermore, resistance components of the antennae for power transmission and reception also vary, and thus are a variable parameter.

Desired here is a technique capable of efficiently transmitting power wirelessly even if such variations in positional relationship of the antennae for power transmission and reception and the load power are observed. Hence, based on output signals of the voltage detector 160 and the current detector 170, the control circuit 150 in this embodiment regulates an output voltage instruction value to the output voltage variable DC/DC converter 120, in order to minimize the output power to the inverter 130.

Figure 3:
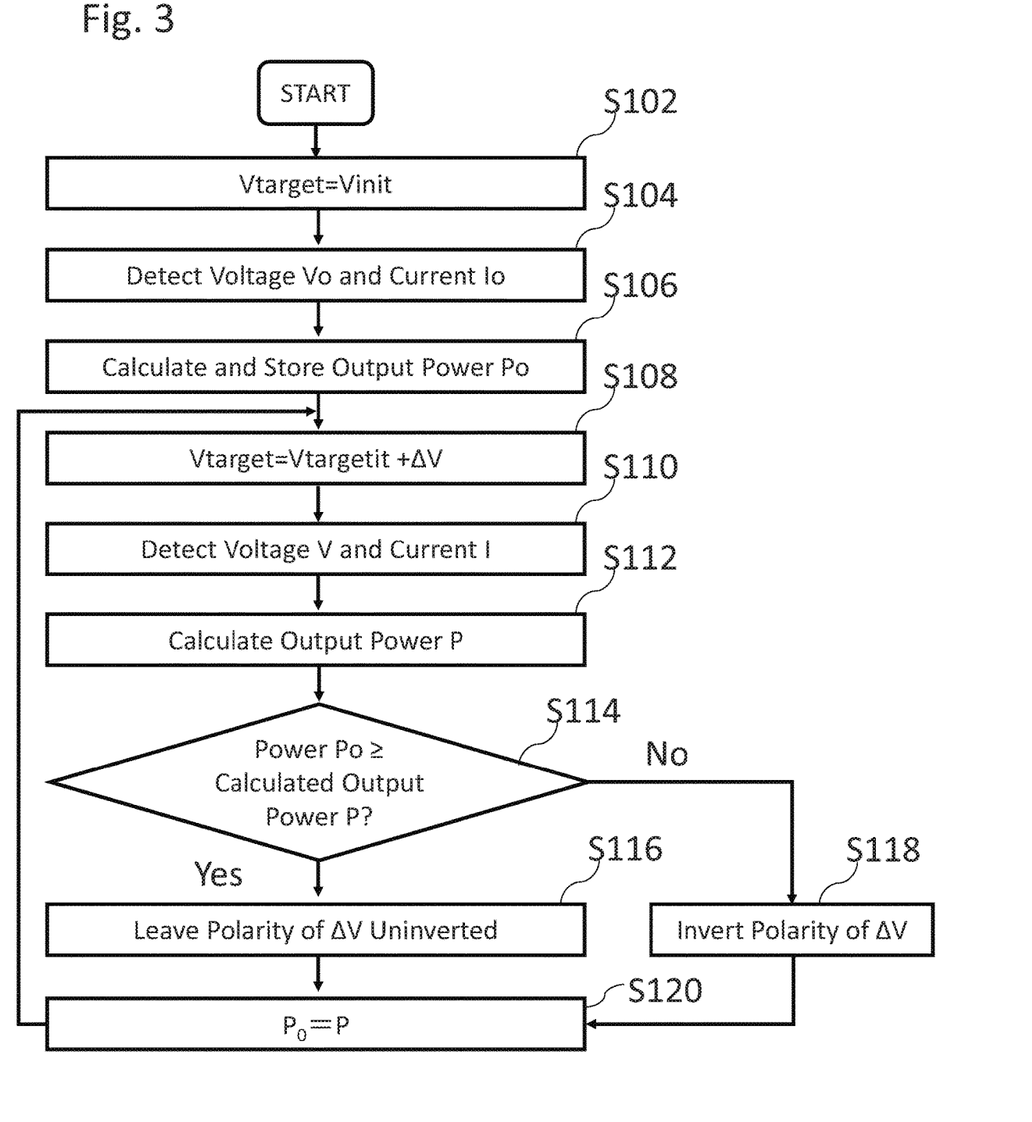
FIG. 3 illustrates a flowchart showing processing by a controller according to the first embodiment.

More specifically, the control circuit 150 executes processing as shown in FIG. 3. That is, the control circuit 150 sets an output voltage instruction value Vtarget to a Vinit, and controls the output voltage variable DC/DC converter 120 to output a constant voltage (Step S102). The control circuit 150 obtains an output voltage value Vo from the voltage detector 160 and an output current value Po from the current detector 170 (Step S104). The control circuit 150 calculates an output power value Po from the output voltage value Vo and the output current value Io, and stores the calculated output power value Po (Step S106).

Next, the control circuit 150 updates the output voltage instruction value Vtarget to be a Vtarget+$\Delta$V, and controls the output voltage variable DC/DC converter 120 to output a constant voltage (Step S108). Here, the polarity of $\Delta$V may be either positive or negative. The control circuit 150 further obtain a new output voltage value V from the voltage detector 160 and a new output current value I from the current detector 170 (Step S110). The control circuit 150 calculates air output power value P (second power consumption) from the new output voltage value V and the new output current value I (Step S112). The control circuit 150 compares the previous output power value Po stored and this output power value P (Step S114).

If determining that the output power value P is equal the output power value Po or smaller (Step S114: YES), the control circuit 150 leaves the polarity of $\Delta$V uninverted (Step S116). That is, the control circuit 150 determines that the variation in the output voltage decrease in the output power value P. The control circuit 150 updates and stores the output power value P (Step S120).

Meanwhile, if determining that the output power value P is greater than the output power value Po (Step S114: NO), the control circuit 150 inverts the polarity of $\Delta$V (Step S118). That is, the control circuit 150 determines that the variation in the output voltage instruction value Vtarget with the polarity of $\Delta$V at this moment would cause a variation, of the output power value P, opposite to the reduction. The control circuit 150 proceeds to Step S120.

Figure 4:
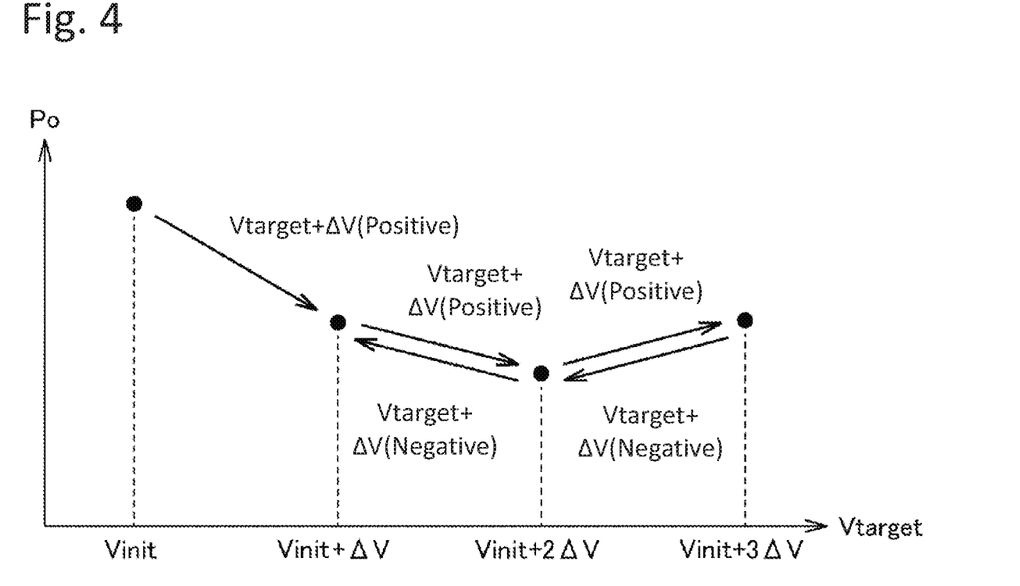
FIG. 4 schematically illustrates variations in voltage and power consumption according to the first embodiment.

FIG. 4 illustrates (i) a process of the output voltage instruction value Vtarget increased from the Vinit to a Vinit+3$\Delta$V and brought back to the Vinit+$\Delta$V, and (ii) a transition of the power output from the output voltage variable DC/DC converter 120 in accordance with the variation of the Vtarget.; that is, a transition of the power consumption of the inverter 130 and the components downstream from the inverter 130. Here, the polarity of the $\Delta$V is to be positive. As illustrated in FIG. 4, when the output voltage instruction value Vtarget is the Vinit+$\Delta$V, the comparison between the output power value P (the newly detected value) and the output power value Po (the stored value) shows that the output power value P is smaller than the output power value Po. Hence, the $\Delta$V is added to the output voltage instruction value Vtarget so that the Vinit+$\Delta$V varies to be the Vinit+2$\Delta$V. Hence, the control circuit 150 varies the output voltage instruction value Vtarget in the order of the Vinit+$\Delta$V, to the Vinit+2$\Delta$V, the Vinit+3$\Delta$V, the Vinit+2$\Delta$V, the Vinit+$\Delta$V, the Vinit+2$\Delta$V . . . , including the Vinit+2$\Delta$V minimizing the output power value P.

Because of the operation in varying the output voltage instruction value Vtarget, even if the Vtarget minimizing the output power value P varies along with the change in the positional relationship between the power transmitter 140 and the power receiver 210, the control circuit 150 can follow the variation and search for the output voltage instruction value Vtarget. Such a feature makes it possible to offer a wireless power transmission system operating on the Vtarget achieving the optimum conversion efficiency.

The wireless power transmission system 1 according to this embodiment determines whenever necessary the operating voltage Vtarget, of the inverter 130, minimizing the input voltage to the inverter 130. Such a feature makes it possible to determine and regulate the Vtarget for executing efficient wireless power supply, reflecting losses caused by the inverter 130, the power transmitter 140, the power receiver 210, the rectifier 220, and the DC/DC converter 230.

Note that, in the wireless power transmission system according to this embodiment, the control circuit 150 does not have to be included in the wireless power transmission apparatus 100; alternatively, the control circuit 150 may be a circuit included in an external apparatus such as a personal computer (PC). If the control circuit 150 is not included in the wireless power transmission apparatus 100, the control circuit 150 and the wireless power transmission apparatus 100 may exchange a control signal or an output signal through wire or wirelessly.

Second Embodiment

Figure 5:
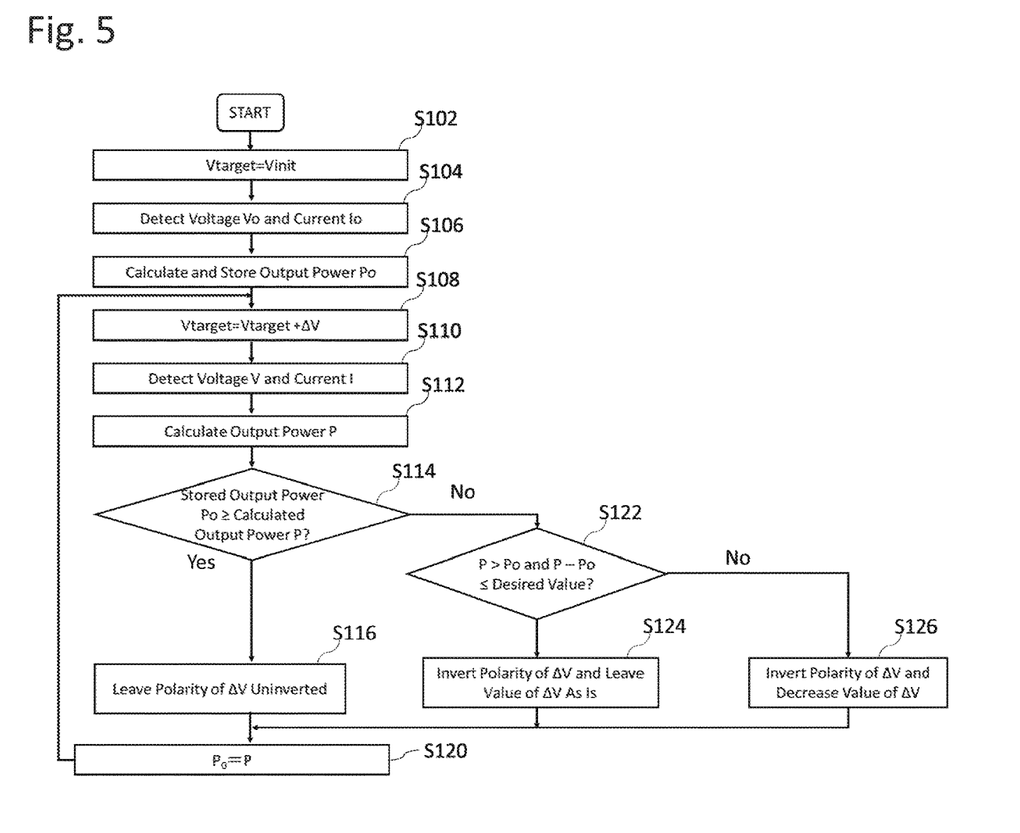
FIG. 5 illustrates a flowchart showing processing by the controller according to a second embodiment.

In order to search for the optimum Vtarget, the control circuit 150 may perform the processing as follows. As illustrated in FIG. 5, if determining that the output power value P is greater than the output power value Po (Step S114: NO), the control circuit 150 determines whether a difference between the output power value P and the output power value Po is of a desired value or smaller (e.g., set between 0.5 W and 1.0 W) (Step S122). If the difference between the output power value P and the output power value Po is of the desired value or smaller (Step S122: YES), the control circuit 150 inverts the polarity of the $\Delta V$ (Step S124), and proceeds to Step S120.

Meanwhile, if the difference between the output power value P and the output power value Po is greater than the desired value (Step S122: NO), the control circuit 150 inverts the polarity of, and decreases the value of, the $\Delta V$ (Step S124), and proceeds to Step S120.

Figure 6:
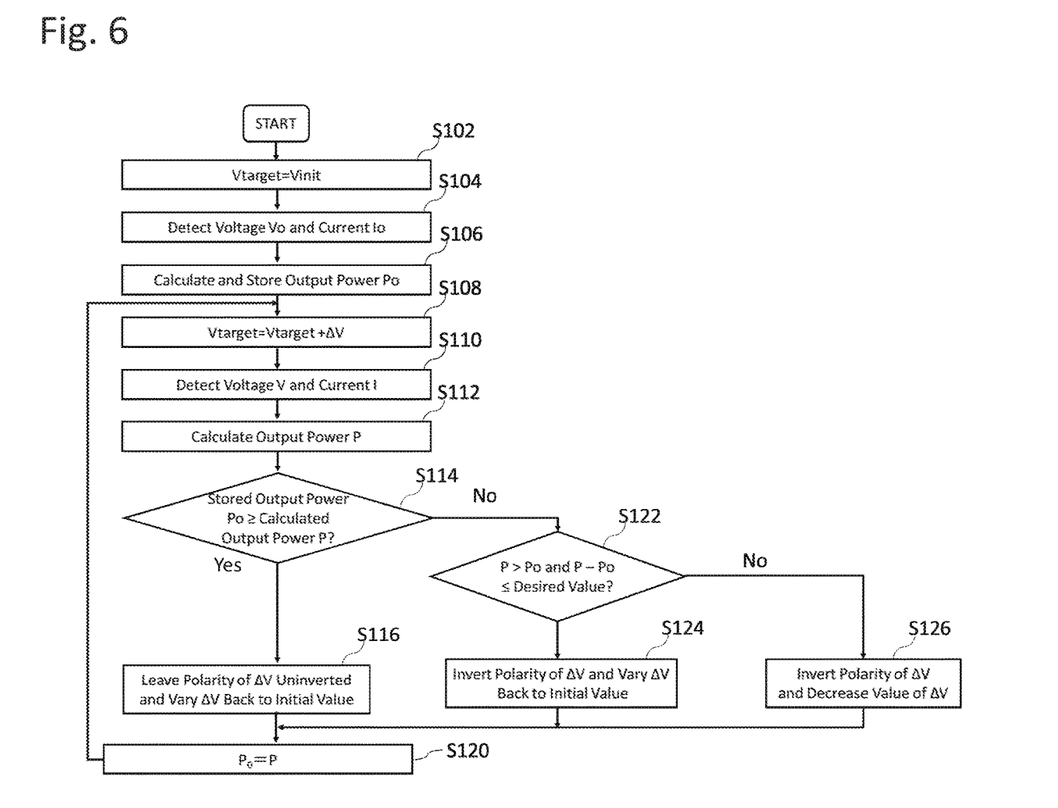
FIG. 6 illustrates a flowchart showing second processing by the controller according to the second embodiment.
Figure 7:
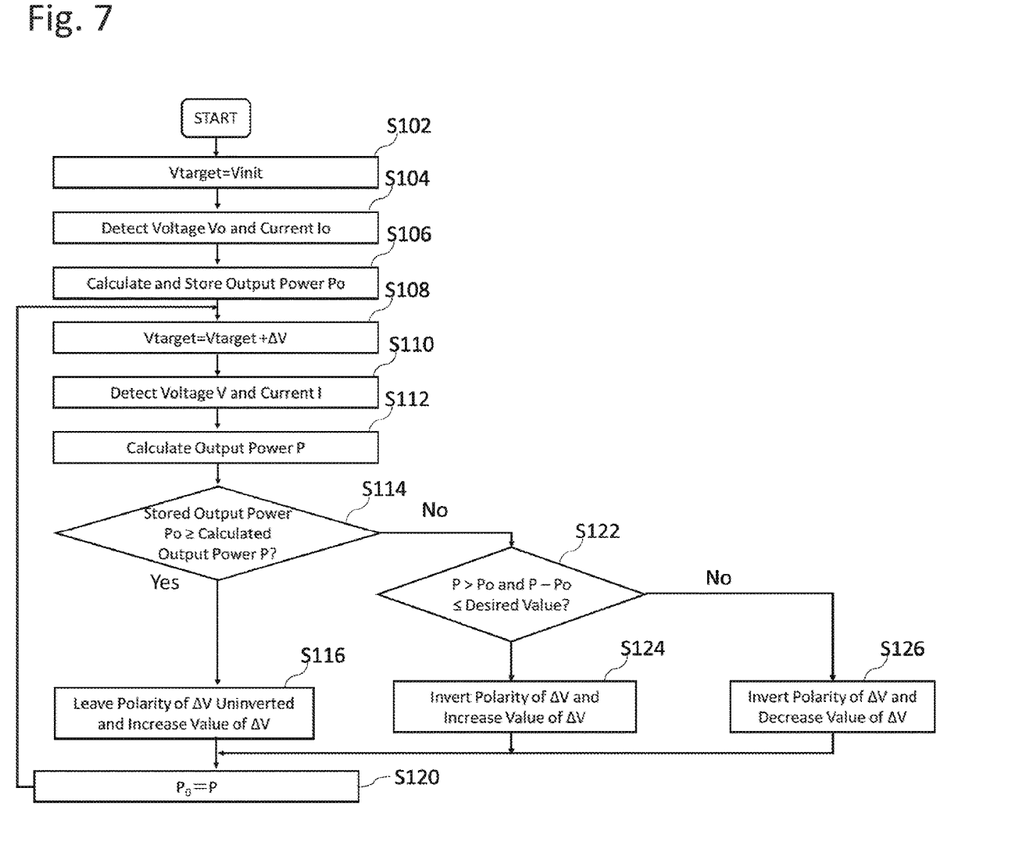
FIG. 7 illustrates a flowchart showing third processing by the controller according to the second embodiment.
Figure 8:
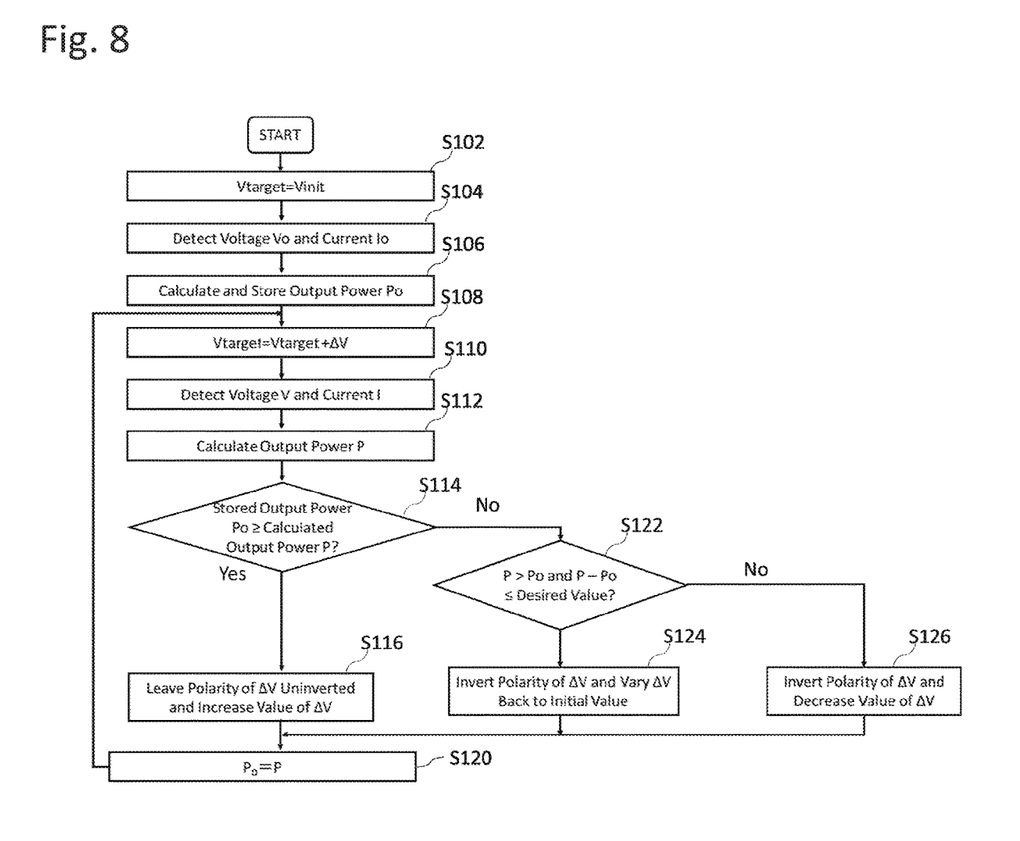
FIG. 8 illustrates a flowchart showing fourth processing of the controller according to the second embodiment.

Note that, more specifically as illustrated in FIG. 6, the control circuit 150 may store an initial value of the $\Delta V$, and, in YES in Step S114 and in YES in S122, vary the $\Delta V$ back to the initial value. Moreover, in YES in Step S114 and in YES in S122 as illustrated in FIG. 7, the control circuit 150 may increase the value of the $\Delta V$. Furthermore, as illustrated in FIG. 8, the control circuit 150 may increase the $\Delta V$ in YES in Step S114, and may vary the value of the $\Delta V$ back to the initial value in YES in Step S122.

Third Embodiment

Figure 9:
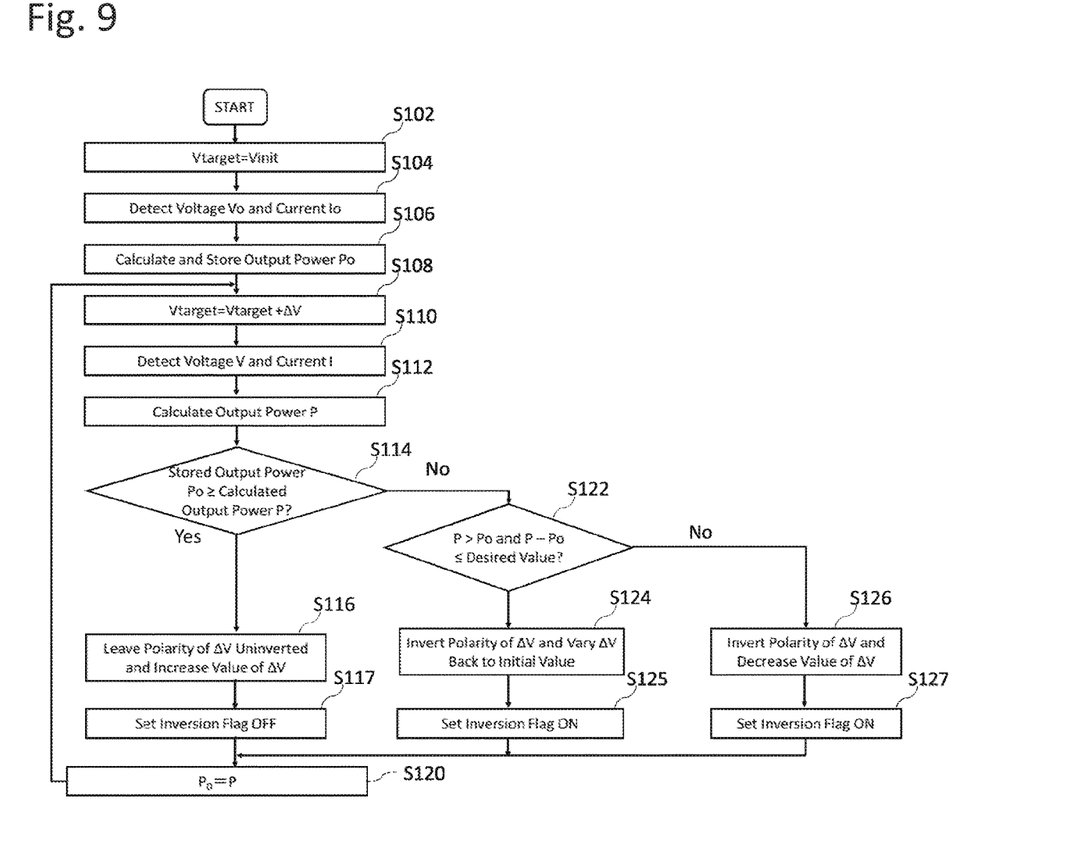
FIG. 9 illustrates a flowchart showing processing by a controller according to a third embodiment.

In order to quickly search for the optimum Vtarget, the control circuit 150 may perform the processing as follows. As shown in FIG. 9, if determining that the output power value P is equal to the output power value Po or smaller (Step S114: YES), the control circuit 150 leaves the polarity of $\Delta V$ uninverted (Step S116), and sets an inversion flag OFF (Step S117).

Meanwhile, if determining that the output power value P is greater than the output power value Po (Step S114: NO), the control circuit 150 determines whether the inversion flag is ON (Step S123). If the inversion flag is OFF (Step S123: NO), the control circuit 150 inverts the polarity of the $\Delta V$ and varies $\Delta V$ back to the initial value (Step S124). The control circuit 150 sets the inversion flag ON (Step S125).

If the inversion flag is ON (Step S123: YES), the control circuit 150 inverts the polarity of, and decreases the value of, the $\Delta V$ (Step S126). The control circuit 150 sets the inversion flag ON (Step S127).

Figure 10:
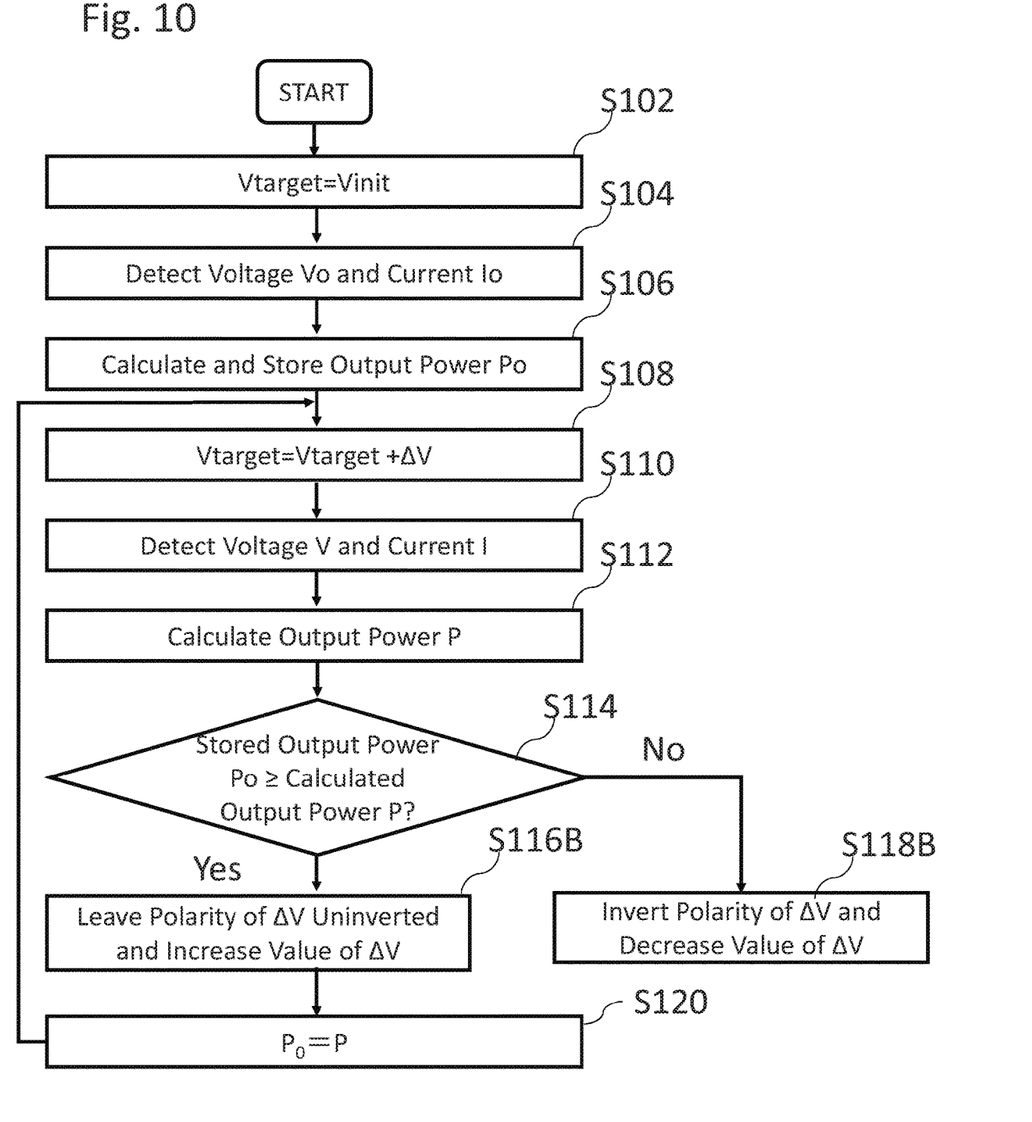
FIG. 10 illustrates a flowchart showing second processing by the controller according to the third embodiment.

Note that, as illustrated in FIG. 10, if simply determining that the output power value P is equal to the output power value Po or smaller (Step S114: YES), the control circuit 150 may leave the polarity of the $\Delta V$ uninverted and increase the value of the $\Delta V$ (Step S116B). If determining that the output power value P is greater than the output power value Po, (Step S114: NO), the control circuit 150 may invert the polarity of, and decrease the value of, the $\Delta V$ (Step S118B).

Fourth Embodiment

Figure 11:
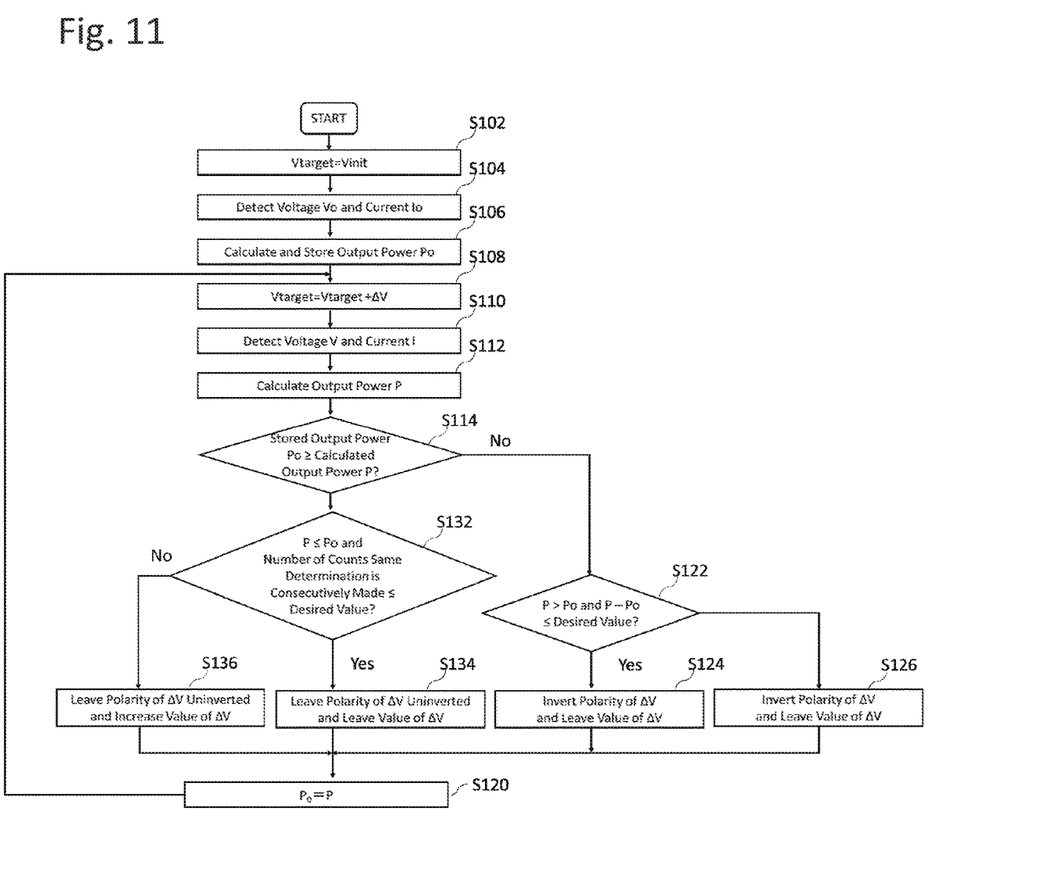
FIG. 11 illustrates a flowchart showing processing by the controller according to a fourth embodiment.

In order to quickly search for the optimum Vtarget, the control circuit 150 may perform the processing as follows. In this embodiment, the control circuit 150 is to store the number of counts the same determination is consecutively made. As illustrated in FIG. 11, if the output power value P is equal to the output power value Po or smaller (Step S114: YES), the control circuit 150 determines whether the number of counts the same determination is consecutively made is equal to a predetermined number or less (Step S132).

If the number of counts the same determination is consecutively made is equal to the predetermined number of counts or less (Step S132: YES), the control circuit 150 leaves the polarity of the $\Delta V$ uninverted (Step S134), and proceeds to Step S120. Meanwhile, if the number of counts the same determination is consecutively made is more than the predetermined number of counts (Step S132: NO), the control circuit 150 leaves the polarity of the $\Delta V$ uninverted, and increases the value of $\Delta V$ (Step S136).

Meanwhile, if determining that the output power value P is greater than the output power value Po (Step S114: NO), the control circuit 150 determines whether the difference between the output power value P and the output power value Po is of a desired value or smaller (Step S122). If the difference between the output power value P and the output power value Po is of the desired value or smaller (Step S122: YES), the control circuit 150 inverts the polarity of the $\Delta V$ (Step S124), and proceeds to Step S120.

Meanwhile, if the difference between the output power value P and the output power value Po is greater than the desired value (Step S122: NO), the control circuit 150 inverts the polarity of, and decreases the value of, the $\Delta V$ (Step S124), and proceeds to Step S120.

SUMMARY

The above embodiments provide the wireless power transmission apparatus 100 including: the power transmission coil 142; the inverter 130 configured to drive the power transmission coil 142; the DC/DC converter 120 configured to drive the inverter 130; and the control circuit 150 configured to vary and determine an output voltage instruction value to the DC/DC conversion circuit, in order to decrease power output from the DC/DC converter 120.

Preferably, the wireless power transmission apparatus 100 may further include: a voltage detector 160 connected in parallel with the output voltage variable DC/DC converter 120 and the inverter 130; and a current detector connected in series between the output voltage variable DC/DC converter 120 and the inverter 130. The controller 150 may (i) compare a first power consumption value and a second power consumption value, the first power consumption value being calculated from a value of a voltage measured by the voltage detector 160 and a value of a current measured by the current detector 170, and the second power consumption value being calculated, with the output voltage instruction value varied, from a value of a voltage measured by the voltage detector 160 and a value of a current measured by the current detector 170, (ii) further vary the output voltage instruction value in the same direction as the output voltage instruction value has varied if the second power consumption value is equal to the first power consumption value or smaller, and (iii) vary the Output voltage instruction value in a direction different from a direction in which the output voltage instruction value has varied if the second power consumption value is greater than the first power consumption value.

Preferably, when varying the output voltage instruction value in the direction different from the direction in which the output voltage instruction value has varied, the controller 150 may decrease a degree of the variation in the output voltage instruction value if a difference between the first power consumption value and the second power consumption value is greater than a threshold.

Preferably, when further varying the output voltage instruction value in the same direction as the output voltage instruction value has varied, the controller 150 may increase a degree of the variation in the output voltage instruction value.

Preferably, when further varying the output voltage instruction value in the same direction as the output voltage instruction value has varied, the controller 150 may increase a degree of the variation in the output voltage instruction value if the number of counts the output voltage instruction value varies in the same direction is more than a threshold.

The embodiments disclosed herein are examples in every respect, and not limiting of the present disclosure. The scope of the present disclosure is defined not by the descriptions above but by the scope of claims, and is intended to include all the modifications within the scope of the claims along with the their full scope of equivalents.

The invention claimed is:

1. A wireless power transmission apparatus comprising:
a power transmission coil;
an inverter configured to drive the power transmission coil;
a DC/DC conversion circuit configured to drive the inverter; and
a controller configured to determine an output voltage instruction value to be subsequently varied, in order to decrease power output from the DC/DC conversion circuit, in accordance with a result of comparison between the power output from the DC/DC conversion circuit before variation of an output voltage instruction value to the DC/DC conversion circuit and the power output from the DC/DC conversion circuit after variation of the output voltage instruction value to the DC/DC conversion circuit.

2. The wireless power transmission apparatus according to claim 1, further comprising:
a voltage detector connected in parallel with the DC/DC conversion circuit and the inverter; and
a current detector connected in series between the DC/DC conversion circuit and the inverter, wherein
the controller (i) compares a first power consumption value and a second power consumption value, the first power consumption value being calculated from a value of a voltage measured by the voltage detector and a value of a current measured by the current detector, and the second power consumption value being calculated, with the output voltage instruction value varied, from a value of a voltage measured by the voltage detector and a value of a current measured by the current detector, (ii) further varies the output voltage instruction value in the same direction as the output voltage instruction value has varied if the second power consumption value is equal to the first power consumption value or smaller, and (iii) varies the output voltage instruction value in a direction different from a direction in which the output voltage instruction value has varied if the second power consumption value is greater than the first power consumption value.

3. The wireless power transmission apparatus according to claim 2, wherein
when varying the output voltage instruction value in the direction different from the direction in which the output voltage instruction value has varied, the controller decreases a degree of the variation in the output voltage instruction value if a difference between the first power consumption value and the second power consumption value is greater than a threshold.

4. The wireless power transmission apparatus according to claim 2, wherein
when further varying the output voltage instruction value in the same direction as the output voltage instruction value has varied, the controller increases a degree of the variation in the output voltage instruction value.

5. The wireless power transmission apparatus according to claim 2, wherein
when further varying the output voltage instruction value in the same direction as the output voltage instruction value has varied, the controller increases a degree of the variation in the output voltage instruction value if the number of counts the output voltage instruction value varies in the same direction is more than a threshold.

6. A wireless power transmission system comprising:
a wireless power transmission apparatus including a power transmission coil;
an inverter configured to drive the power transmission coil;
a DC/DC conversion circuit configured to drive the inverter; and
a controller configured to determine an output voltage instruction value to be subsequently varied, in order to decrease power output from the DC/DC conversion circuit, in accordance with a result of comparison between the power output from the DC/DC conversion circuit before variation of an output voltage instruction value to the DC/DC conversion circuit and the power output from the DC/DC conversion circuit after variation of the output voltage instruction value to the DC/DC conversion circuit.

7. The wireless power transmission system according to claim 6, further comprising:
a power receiver including a coil for receiving a power from the wireless power transmission apparatus.

8. The wireless power transmission system according to claim 6, further comprising:
a voltage detector connected in parallel with the DC/DC conversion circuit and the inverter; and
a current detector connected in series between the DC/DC conversion circuit and the inverter, wherein
the controller (i) compares a first power consumption value and a second power consumption value, the first power consumption value being calculated from a value of a voltage measured by the voltage detector and a value of a current measured by the current detector, and the second power consumption value being calculated, with the output voltage instruction value varied, from a value of a voltage measured by the voltage detector and a value of a current measured by the current detector, (ii) further varies the output voltage instruction value in the same direction as the output voltage instruction value has varied if the second power consumption value is equal to the first power consumption value or smaller, and (iii) varies the output voltage instruction value in a direction different from a direction in which the output voltage instruction value has varied if the second power consumption value is greater than the first power consumption value.

9. The wireless power transmission system according to claim 8, wherein when varying the output voltage instruction value in the direction different from the direction in which the output voltage instruction value has varied, the controller decreases a degree of the variation in the output voltage instruction value if a difference between the first power consumption value and the second power consumption value is greater than a threshold.

10. The wireless power transmission system according to claim 8, wherein when further varying the output voltage instruction value in the same direction as the output voltage instruction value has varied, the controller increases a degree of the variation in the output voltage instruction value.

11. The wireless power transmission system according to claim 8, wherein when further varying the output voltage instruction value in the same direction as the output voltage instruction value has varied, the controller increases a degree of the variation in the output voltage instruction value if the number of counts the output voltage instruction value varies in the same direction is more than a threshold.

* * * * *